United States Patent
Hanwell et al.

(10) Patent No.: US 11,153,467 B2
(45) Date of Patent: Oct. 19, 2021

(54) IMAGE PROCESSING

(71) Applicant: Apical Limited, Cambridge (GB)

(72) Inventors: David Hanwell, Cambridge (GB); Laurence Mark Arden, Cambridge (GB)

(73) Assignee: Apical Limited, Cambridge (GB)

( * ) Notice: Subject to any disclaimer, the term of this patent is extended or adjusted under 35 U.S.C. 154(b) by 42 days.

(21) Appl. No.: 16/809,294

(22) Filed: Mar. 4, 2020

(65) Prior Publication Data
US 2020/0351417 A1 Nov. 5, 2020

(30) Foreign Application Priority Data
May 2, 2019 (GB) ...................... 1906198

(51) Int. Cl.
*H04N 5/217* (2011.01)
*H04N 5/14* (2006.01)
*H04N 5/225* (2006.01)

(52) U.S. Cl.
CPC ............. *H04N 5/217* (2013.01); *H04N 5/144* (2013.01); *H04N 5/2258* (2013.01)

(58) Field of Classification Search
CPC ....... H04N 5/144; H04N 5/217; H04N 5/2258
See application file for complete search history.

(56) References Cited

U.S. PATENT DOCUMENTS

| | | | | |
|---|---|---|---|---|
| 2010/0259626 | A1* | 10/2010 | Savidge | H04N 5/2355 348/208.4 |
| 2011/0090242 | A1* | 4/2011 | Cote | H04N 9/04517 345/597 |
| 2011/0242422 | A1* | 10/2011 | Hong | H04N 5/2176 348/614 |
| 2016/0028967 | A1* | 1/2016 | Sezer | H04N 5/23296 348/240.2 |
| 2016/0112637 | A1* | 4/2016 | Laroia | H04N 5/2257 348/221.1 |
| 2019/0220984 | A1* | 7/2019 | Ohta | H04N 5/91 |

FOREIGN PATENT DOCUMENTS

| | | |
|---|---|---|
| GB | 2251353 A | 7/1992 |
| WO | 9739572 A1 | 10/1997 |

OTHER PUBLICATIONS

United Kingdom Combined Search and Examination Report dated Nov. 1, 2019 for GB Application No. 1906198.5.

* cited by examiner

*Primary Examiner* — Amy R Hsu
(74) *Attorney, Agent, or Firm* — EIP US LLP

(57) ABSTRACT

A method and apparatus for processing image data is provided. The method comprises storing accumulated image data, obtaining a new frame of image data, performing motion detection based at least on the new frame of image data, updating the accumulated frame of image data, and generating output image data. The motion detection identifies a pixel location in which motion is detected. For the pixel location identified by the motion detection, a pixel intensity value of the new frame of image data contributes more to a pixel intensity value representing the identified pixel location in the updated accumulated imaged data than to a pixel intensity value representing the identified pixel location in the output image data.

18 Claims, 6 Drawing Sheets

IMAGE PROCESSING

CROSS-REFERENCE TO RELATED APPLICATIONS

This application claims the benefit under 35 U.S.C. § 119(a) and 37 CFR § 1.55 to United Kingdom patent application no. GB 1906198.5 filed on May 2, 2019, the entire content of which is incorporated herein by reference.

BACKGROUND OF THE INVENTION

Field of the Invention

The present disclosure relates generally to methods and apparatus for processing image data. More specifically, the present disclosure relates to temporal de-noising of image data.

Description of the Related Technology

Image sensors for capturing images may be present in devices such as digital cameras, mobile phone cameras, and other image capturing devices. Image sensors used to capture images may comprise millions of individual sensor elements for determining an intensity of light arriving on the sensor at each sensor element. Each sensor element represents a pixel. The light intensity information gathered by these sensors may be used to recreate an image captured by the sensor. Light intensity information gathered by these sensors may be susceptible to signal noise which may introduce errors in the light intensity information. Noise may be introduced into light intensity information from several sources. Shot noise, arising due to the quantized nature of light occurs in the photon count of the sensor element and has a Poisson distribution. Dark current noise arises from small currents in the sensor elements when no radiation is being received and has a Normal distribution. Dark current noise may be dependent on environmental factors such as temperature. Read noise arises from the electronics in the image sensor and is related to the level of analogue-gain used by the sensor. Read noise has a Normal distribution.

Some known image processing techniques include capturing a plurality of frames of image data of the same scene and averaging them together to reduce the noise in the resulting image. Image data representing a cumulative average image is output while further frames of image data are captured and averaged. This output of cumulative image data may be further processed, stored, displayed, and/or manipulated by other methods and/or devices. If a part of a scene which is being captured moves between capturing a successive frame of image data, or during the capture of the successive frame of image data, then combining that part of the successive frame with the accumulated image can cause artefacts to be present such as repeats of the same object and/or edges and details of the moving objects in the scene appearing blurred or smeared. Where there is motion only the most recently captured image is used in that part of the image. However, where motion is detected and only the most recent image is used, the level of noise is higher than in the parts of the image which maintain the accumulated image. Detecting motion is non-trivial due to the noise in each image and where noise is interpreted as motion the accumulated image will be underutilised resulting in higher noise levels.

It is desirable to decrease the noise in the cumulative average image and to more accurately detect motion.

SUMMARY

According to a first aspect of the present disclosure, there is provided a method of processing image data comprising:

storing accumulated image data representing a plurality of frames of image data, the accumulated image data including an accumulated frame of image data comprising a plurality of pixel intensity values representing a respective plurality of pixel locations;

obtaining a new frame of image data comprising a plurality of pixel intensity values representing a respective plurality of pixel locations;

performing motion detection based at least on the new frame of image data, the motion detection identifying a pixel location in which motion is detected;

updating the accumulated frame of image data by combining the accumulated frame of image data and the new frame of image data; and generating output image data by combining the accumulated frame of image data and the new frame of image data, wherein the method is motion-sensitive such that a pixel intensity value of the new frame of image data representing the identified pixel location contributes more to a pixel intensity value representing the identified pixel location in the updated accumulated frame of image data than to a pixel intensity value representing the identified pixel location in the output image data.

According to a second aspect the present disclosure, there is provided an image processing apparatus comprising:

at least one processor;

at least one memory including computer program code, the at least one memory and the computer program code configured to, with the at least one processor, cause the apparatus to perform a method comprising at least:

storing accumulated image data representing a plurality of frames of image data, the accumulated image data including an accumulated frame of image data comprising a plurality of pixel intensity values representing a respective plurality of pixel locations;

obtaining a new frame of image data comprising a plurality of pixel intensity values representing a respective plurality of pixel locations;

performing motion detection based at least on the new frame of image data, the motion detection identifying a pixel location in which motion is detected;

updating the accumulated frame of image data by combining the accumulated frame of image data and the new frame of image data; and generating output image data by combining the accumulated frame of image data and the new frame of image data, wherein the method if motion-sensitive such that a pixel intensity value of the new frame of image data representing the identified pixel location contributes more to a pixel intensity value representing the identified pixel location in the updated accumulated frame of image data than to a pixel intensity value representing the identified pixel location in the output image data.

According to a third aspect of the present disclosure there is provided, a non-transitory computer-readable storage medium comprising computer-executable instructions which when executed by a processor cause operation of an image processing system to perform a method comprising at least:

storing accumulated image data representing a plurality of frames of image data, the accumulated image data including an accumulated frame of image data comprising a plurality of pixel intensity values representing a respective plurality of pixel locations;

obtaining a new frame of image data comprising a plurality of pixel intensity values representing a respective plurality of pixel locations;

performing motion detection based at least on the new frame of image data, the motion detection identifying a pixel location in which motion is detected;

updating the accumulated frame of image data by combining the accumulated frame of image data and the new frame of image data; and generating output image data by combining the accumulated frame of image data and the new frame of image data, wherein the method if motion-sensitive such that a pixel intensity value of the new frame of image data representing the identified pixel location contributes more to a pixel intensity value representing the identified pixel location in the updated accumulated frame of image data than to a pixel intensity value representing the identified pixel location in the output image data.

Further features and advantages will become apparent from the following description of preferred embodiments of the invention, given by way of example only, which is made with reference to the accompanying drawings.

BRIEF DESCRIPTION OF THE DRAWINGS

Various features of the present disclosure will be apparent from the detailed description which follows, taken in conjunction with the accompanying drawings, which together illustrate features of the present disclosure, and wherein.

DETAILED DESCRIPTION OF CERTAIN INVENTIVE EMBODIMENTS

Details of examples will become apparent from the following description, with reference to the Figures. In this description, for the purpose of explanation, numerous specific details of certain examples are set forth. Reference in the specification to "an example" or similar language means that a particular feature, structure, or characteristic described in connection with the example is included in at least that one example but not necessarily other examples. It should be further noted that certain examples are described schematically with certain features omitted and/or necessarily simplified for ease of explanation and understanding of the concepts underlying the examples.

Examples described herein relate to temporal de-noising of image data by averaging a plurality of frames of image data. In particular, examples described herein relate to a method of temporal de-noising in which, where motion is detected, a store of accumulated image data is corrected according to the detected motion but the output image data, output per frame of image data, is initially not corrected. In regions where motion is corrected, the noise increases as these regions will be generated from fewer frames of image data. If further motion is not subsequently detected in these regions, the noise will begin to decrease as further frames of image data are accumulated and/or averaged. By delaying the motion correction on the output image data and waiting for at least one subsequent frame before outputting the motion corrected regions, the noise in regions where motion was detected may be reduced before being output and/or displayed.

Figure 1:
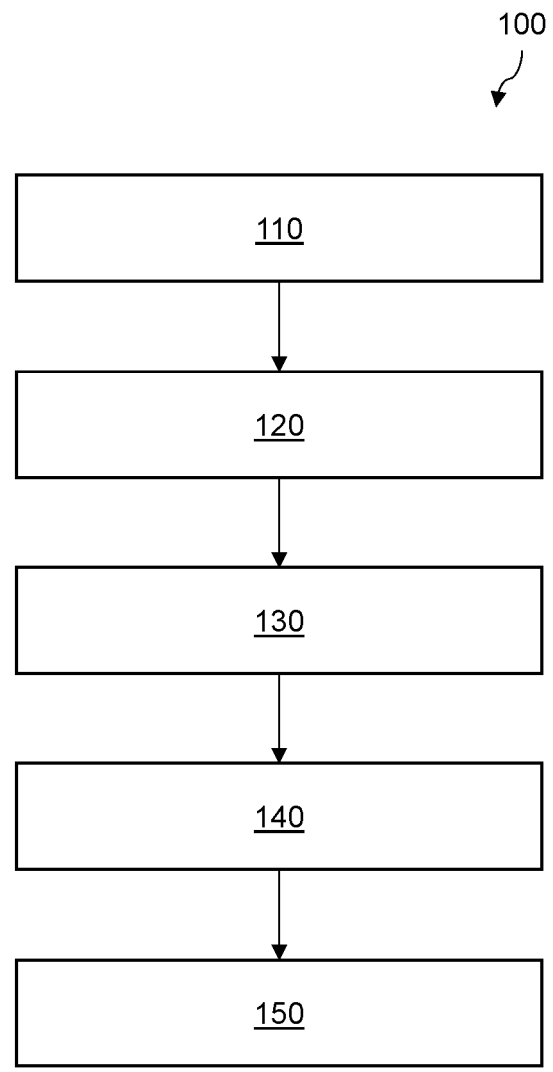
FIG. 1 shows a flow chart of a method according to an example.

FIG. 1 shows a flow chart of a method 100 for processing image data. The method comprises, at block 110, storing accumulated image data representing a plurality of frames of image data. The accumulated image data including an accumulated frame of image data comprises a plurality of pixel intensity values representing a respective plurality of pixel locations. The plurality of frames of image data are generated from one or more image sensors.

Image sensors may comprise an array of sensor elements, also referred to as sensor pixels. The sensor pixels may comprise a photosensitive element, also called a photosensor, for example a photodiode that can convert incident light into electronic signals or data. The sensor pixels may comprise any photosensor suitable for capturing images. Further examples of sensor pixel photosensitive elements may include, charge-coupled devices (CCDs), or complementary metal-oxide semiconductors (CMOSs). When capturing frames of image data, the image sensor may be exposed to incident light for a predetermined period of time, called an exposure time. Alternatively, the image sensor may be continually exposed to incident light and signals from the sensor may be read over a given period of time which may also be referred to as an exposure time. During this exposure, incident photons are converted into electrons by the photosensor and the charge may be stored by a capacitor. Each sensor pixel may further comprise circuitry configured to measure the charge stored by their respective capacitor and to convert the amount of charge stored to a digital value. This digital value may be called a pixel intensity value. Each frame of image data may represent at least one characteristic of the light captured by an image sensor for that frame. The frames of image data may be representative of an intensity of the light captured by each sensor pixel for that frame, the intensity of light may be proportional to the number of photons captured by that sensor pixel. The intensity may represent a luminance of captured light, which is for example a measure of the intensity of light per unit area rather than absolute intensity. In other examples, the frames of image data may be representative of a brightness of captured light, which may be considered to correspond to a perception of luminance, which may or may not be proportional to luminance. The frames of image data may be representative of any photometric quantity or characteristic that may be used to represent the visual appearance of the images represented by the frames of image data. The frames of image data may be generated and/or stored in any suitable format, for example raw image format.

Image data generated from an image sensor is susceptible to noise of a variety of types. Shot noise arises in the number of photons detected by a photosensor, caused by statistical quantum fluctuations, wherein the shot noise at each sensor pixel is independent of the shot noise at other sensor pixels. Shot noise has a Poisson distribution. Dark current noise arises from relatively small electric currents which flow through photosensors such as charge-coupled device even when there is no incident radiation being captured by the photosensor. Dark current noise is independent of the photon count and may be related to the temperature of the photosensor. Dark current noise has a Normal distribution. Read noise is related to the analogue gain used by the image sensor and has a Normal distribution.

The accumulated image data may be generated by accumulating a frame of image data, in which successive frames of image data are combined with a stored accumulated frame of image data. Storing an accumulated frame of image data, generated from a plurality of frames of image data, may be a more efficient way of storing data corresponding to the plurality of frames of image data rather than storing each of the plurality of frames of image data.

Combining successive frames of image data may involve averaging, which in this context may include blending each subsequent frame of image data with the stored accumulated frame of image data such that all of the accumulated frames are equally weighted. Combining successive frames may also involve the method of averaging as described herein. Each frame of image data may comprise an equal number of pixel intensity values representing respective pixel locations as the other frames of image data. Accumulating a frame of image data may comprise averaging pixel intensity values of each frame of image data with respective pixel intensity values of other frames of image data. This results in an accumulated frame of image data comprising a plurality of pixel intensity values representing a respective plurality of pixel locations. Each of the pixel intensity values of the accumulated frame of image data being generated based on a plurality of pixel intensity values of the frames of image data which were accumulated. Accumulating a frame of image data by averaging successive frames of image data reduces the noise in the resultant frame of image data. As the noise value at each pixel location is independent between successive frames, combining N frames of image data reduces the noise in the accumulated frame by a factor of $\sqrt{N}$ in comparison to the noise of each individual frame of image data. In this context, averaging may comprise calculating a mean value, although it will be appreciated that other types of averaging are also possible, such as calculating a normalized weighted mean in which the frames of image data are not weighted equally. In some examples, the frames of image data may not have an equal number of pixel locations but may still relate to the same scene and/or share a set of pixel locations. Storing the accumulated image data may involve storing the accumulated frame of image data in any suitable format, for example in RAW format.

The method 100 comprises, at block 120, obtaining a new frame of image data comprising a plurality of pixel intensity values representing a respective plurality of pixel locations. The respective plurality of pixel locations represented by the new frame of image data may be the same plurality of pixel locations represented by the accumulated frame of image data. Alternatively, the new frame of image data may represent more or fewer pixel locations than the accumulated frame of image and the accumulated frame of image data and the new frame of image data may have one or more pixel locations in common. At block 130, the method 100 comprises performing motion detection based at least on the new frame of image data, the motion detection identifying a pixel location in which motion is detected. Motion detection may be performed by any suitable method. A preferred example of a method of motion detection is discussed later with reference to FIGS. 3 and 4.

At block 140, the method 100 comprises updating the accumulated frame of image data by combining the accumulated frame of image data and the new frame of image data. At block 150, the method comprises generating output image data by combining the accumulated frame of image data and the new frame of image data. Combining the accumulated frame of image data and the new frame of image data may involve any of a variety of methods. For example, a pixel intensity value from one of the accumulated frame of image data or the new frame of image data may be selected to represent a pixel location. Alternatively, a pixel intensity value of the new frame of image data may be blended with a pixel intensity value of the accumulated frame of image data by, for example, calculating a mean value or a weighted arithmetic mean, such as a normalized weighted mean of the two pixel intensity values. A combination of both selecting and blending pixel intensity values of the new frame of image data and pixel intensity values of the accumulated frame of image data may be used, wherein for different pixel locations, pixel intensity values are determined by either selecting or blending.

The method 100, is motion-sensitive such that a pixel intensity value of the new frame of image data representing the identified pixel location contributes more to a pixel intensity value representing the identified pixel location in the updated accumulated frame of image data than to a pixel intensity value representing the identified pixel location in the output image data. In this way, the output image data does not comprise as much of the new frame of image data in regions where there is motion than the updated accumulated frame of image data. The output image is delayed in showing a motion corrected image based on the new the frame of image data until at least one further frame has been obtained and combined with the updated accumulated frame of image data. Waiting for at least one further frame before outputting the motion regions may reduce the noise in the regions where motion has been detected as more than one frame can be collected and combined before outputting the image data. This may result in a smoother output image being available to be displayed and/or used for further processing during the image capture process.

In an example, the pixel intensity value of the new frame of image data representing the identified pixel location contributes more than a pixel intensity value of the accumulated frame of image data representing the identified pixel location to the pixel intensity value representing the identified pixel location in the updated accumulated frame of image data. In this way, the accumulated frame of image data prioritises the new frame of image data in regions where motion has been detected. This allows the updated accumulated frame of image data to include data corresponding to a most recent state of the scene being captured, thereby increasing the accuracy of future motion detection in subsequent frames. The pixel intensity value of the new frame of image data representing the identified pixel location may contribute less than a pixel intensity value of the accumulated frame of image data representing the identified pixel location to the pixel intensity value representing the identified pixel location in the output image data. In this way, reducing noise in the output image data is prioritised over showing the most recent frame of image data. This prevents noise in the output image from increasing immediately after motion is detected but still allows the motion to be displayed after a subsequent frame is obtained while also reducing the noise.

In a specific example, updating the accumulated frame of image data comprises selecting a respective pixel intensity value of the new frame of image data to represent the identified pixel location. Selecting a pixel intensity value of the new frame of image data representing the identified pixel locations allows regions in which motion has been detected to be represented by the most recent frame of image data. Where the change between the accumulated frame of image data and the new frame of image data is large, selecting a pixel intensity value from the new frame of image data may prevent ghosting or artefacts from being introduced in the updated accumulated frame of image data. Similarly, generating output image data may comprise selecting a respective pixel intensity value of the accumulated frame of image data to represent the identified pixel location. In this case, where motion has been detected the method may comprise outputting the accumulated frame of image data allowing the output image to maintain low noise levels. In an example where a new object enters a scene being captured, for a new frame of image data captured after or as the object enters the scene, the output image data will not show the object. The accumulated frame of image data, however, will store pixel intensity values of the new frame of image data at the pixel locations where the object is present. If the object is still visible at the same pixel locations in a subsequent frame of image data, obtained after the new frame, as in the new frame of image data, the subsequent output image data will show the object by combining or averaging pixel intensity values of the updated accumulated frame of image data representing the object with the subsequent frame of image data. In other examples, updating the accumulated frame of image data and generating the output image data comprises blending the new frame of image data and the accumulated frame of image data in regions where motion has been detected.

The method 100 may comprise maintaining other data related to the accumulated frame of image data. For example, the accumulated image data may comprise data corresponding to a plurality of spatially variant parameter values corresponding to respective pixel locations. Updating the accumulated frame of image data may comprise updating the data corresponding to the plurality of parameter values. The parameter values are spatially variant in that each parameter value corresponds to a pixel location. However, it will be appreciated that some parameter values are represented by equal values. The parameter values may be a plurality of weightings which may be used to blend the new frame of image data with the accumulated frame of image data. For example, the plurality of weightings may represent weightings which when used to blend the new frame of image data with the accumulated frame of image data provide a desired reduction in noise level. In an example, the desired reduction in noise level is an optimal de-noising level. Where the noise in each successive frame of image data is independent of every other frame of image data, a desired noise level, or a desired reduction in noise level, may be achieved by weighting each of the accumulated plurality of frames of image data equally. Data corresponding to the plurality of parameter values may include data indicative of the plurality of parameter values. Alternatively, data corresponding to the plurality of parameter values may comprise a plurality of further parameter values corresponding to respective pixel locations, wherein the plurality of parameter values may be determined from the plurality of further parameter values. Data corresponding to the plurality of parameter values may be stored in any suitable format.

Performing motion detection may comprise generating a plurality of motion detection values. The plurality of motion detection values correspond to a respective plurality of pixel locations and are generated based at least on differences between the pixel intensity values of the accumulated frame of image data and respective pixel intensity values of the new frame of image data. The pixel location may be identified based on a comparison of the plurality of motion detection values and respective parameter values. The plurality of motion detection values may indicate a degree of motion which is present at each respective pixel location. For example, the plurality of motion detection values may be positive values between 0 and 1 wherein for a given pixel location a motion detection value of 1 indicates that motion is present at that pixel location. A motion detection value of 0 means that there is no motion present at that pixel location. The plurality of parameter values may be positive values equal to or less than 1. In this way, identifying a pixel location for which there is motion is dependent on a comparison of a degree of motion at that pixel location and a desired blending level dependent on the number of accumulated frames at that pixel location. In some examples, the further parameter values are related to the number of frames of image data which have been accumulated at respective pixel locations. The plurality of parameter values may have an inverse relationship with the number of frames of image data which have been accumulated at a respective pixel location. Accordingly, where there are few accumulated frames of image data for a given pixel location a large degree of motion has to be present for the pixel location to be identified. Correspondingly, where there are many accumulated frames of image data for a given pixel location, a smaller degree of motion may be detected and may still result in the pixel location being identified. It will be appreciated that although a range of values for the parameter values and the motion detection values have been given above, the values may be different to those described. For example, the parameter values and the motion detection values may be scaled differently, or a function may be applied to these values to modify them.

Updating Accumulated Frame of Image Data

As discussed above a pixel intensity value of the new frame of image data representing the identified pixel location may be blended with a respective pixel intensity value of the accumulated frame of image data to generate an updated pixel intensity value when updating the accumulated frame of image data. A parameter value of the plurality of parameter values for a given pixel location may be referred to as $\alpha_b$. Where $\alpha_b$ is dependent on a further parameter value $N_p$ related to the number of frames of image data which have been accumulated at the given pixel location. A relationship between $\alpha_b$ and $N_p$ is shown below:

$$\alpha_b = \frac{1}{N_p + 1} \tag{1}$$

where $\alpha_b$ is indicative of a proportion of the pixel intensity value of the new frame of image data which would be blended with a respective pixel intensity value of the accumulated frame of image data to achieve a desired reduction in noise level. For example, where a pixel intensity value in the accumulated frame of image data has been generated based on four frames of image data, i.e. $N_p=4$, to achieve a frame of image data with a desired noise level, a pixel intensity value of the new frame of image data will be weighted by 0.2 and the pixel intensity value of the accumulated frame of image data will be weighted by 0.8. The weightings described here may be scaled differently, but the comparative weighting of the pixel intensity value of the new frame of image data and the pixel intensity value of the accumulated image data is what provides the desired noise level. Where the data corresponding to the plurality of parameter values is a plurality of $N_p$ values, the plurality of parameter values may be determined by using a look-up-table. Alternatively, the plurality of parameter values may be calculated explicitly from the stored $N_p$ values either in a single process or as they are needed.

As discussed above a pixel location may be identified when performing motion detection based on a comparison of a respective parameter value $\alpha_b^1$ with a respective motion detection value $\alpha_m^1$. For example, a general relation for whether a pixel location is identified is given below:

$$\alpha_m > \alpha_b \quad (2)$$

where $\alpha_m$ generally represents motion detection values generated for pixel locations and $\alpha_b$ generally represents parameter values corresponding to pixel locations. A pixel location is identified if a respective motion detection value is greater than a respective parameter value.

In an example, updating the accumulated frame of image data comprises generating a pixel intensity value representing the identified pixel location by blending a pixel intensity value of the new frame of image data with a pixel intensity value of the accumulated frame of image data. The pixel intensity values each representing the identified pixel location. The pixel intensity values of the new frame of image data and the accumulated frame of image data may be blended based on a respective motion detection value corresponding to the identified pixel location. An example is expressed in equation 3 below $$I_U^1 = \alpha_m^1 I_N^1 + (1-\alpha_m^1) I_A^1 \quad (3)$$

where: $I_N^1$ is a pixel intensity value of the new frame of image data representing the identified pixel location; $I_A^1$ is a pixel intensity value of the accumulated frame of image data representing the identified pixel location; $I_U^1$ is an updated accumulated pixel intensity value representing the identified pixel location; $\alpha_m^1$ is a respective motion detection value, between 0 and 1, corresponding to the identified pixel location.

After updating the accumulated frame of image data by blending a pixel intensity value of the new frame of image data with a pixel intensity value of the accumulated frame of image data base on a respective motion detection value, $\alpha_m^1$, the parameter value $\alpha_b^1$ corresponding to the pixel location is updated. As $\alpha_b^1$ is dependent on a number of accumulated frames at the pixel location, after blending according to $\alpha_m^1$, $\alpha_b^1$ no longer represents a desired noise blending value. In an example, updating the accumulated frame of image data comprises updating data corresponding to a parameter value $\alpha_b^1$ of the plurality of parameter values which corresponds to the identified pixel location based on the motion detection value. For example, where the data corresponding to the parameter value $\alpha_b^1$ is a further parameter value $N_p^1$, the further parameter value may be updated according to $$N_p^1 = \frac{1}{\alpha_m^1} - 1 \quad (4)$$

Where the pixel intensity value of the new frame of image data $I_N^1$ and the pixel intensity value of the accumulated frame of image data $I_A^1$ are blended according to the motion detection value $\alpha_m^1$ the further parameter value $N_p^1$ may be updated to reflect this. This allows processing of further frames of image data, for example by detecting motion and blending pixel intensity values, to account for the detection of motion in the new frame of image data and the updating of the accumulated frame of image data.

Updating the accumulated frame of image data may comprise generating a pixel intensity value representing a second pixel location which is not identified by the motion detection. The second pixel location not being identified based on a comparison of a respective motion detection value $\alpha_m^2$ and a respective parameter value $\alpha_b^2$, wherein $\alpha_b^2$ is greater than or equal to $\alpha_m^2$. The pixel intensity value representing the second pixel location may be generated by blending a pixel intensity value of the new frame of image data representing the second pixel location with a pixel intensity value of the accumulated frame of image data representing the second pixel location based on a respective parameter value. This is expressed below as $$I_U^2 = \alpha_b^2 I_N^2 + (1-\alpha_b^2) I_A^2 \quad (5)$$

where: $I_N^2$ is a pixel intensity value of the new frame of image data representing the second pixel location, $I_A^2$ is a pixel intensity value of the accumulated frame of image data representing the second pixel location, $I_U^2$ is a pixel intensity value representing the second pixel location in the updated accumulated frame of image data, and $\alpha_b^2$ is a parameter value corresponding to the second pixel location and representing a desired blending level of the pixel intensity value of the new frame of image data with the pixel intensity value of the accumulated frame of image data. As in the case of the first pixel location, the $\alpha_b^2$ should be updated. Updating the accumulated frame of image data may comprise updating data corresponding to a respective parameter value corresponding to the second pixel location. For example, where $\alpha_b^2$ is generated based on a further parameter value $N_p^2$ as in equation 1, $N_p^2$ may be updated by incrementing a value of $N_p^2$ by adding 1. Updating the data corresponding to plurality of parameter values such as updating a plurality of $\alpha_b$ values or updating a plurality of $N_p$ values allows motion in subsequent frames of image data to be accurately detected and allows pixel intensity values to be blended such that the noise level is reduced.

Generating Output Image Data

Generating output image data may comprise generating a pixel intensity value representing the identified pixel location in the output image data by blending a pixel intensity value of the new frame of image data with a pixel intensity value of the accumulated frame of image data. The pixel intensity values each representing the identified pixel location and are blended based on a respective parameter value corresponding to the identified pixel location. As before, where the identified pixel location corresponds to: a motion detection value $\alpha_m^1$, a parameter value $\alpha_b^1$, a pixel intensity value of the new frame of image data $I_N^1$, and a pixel intensity value of the accumulated frame of image data $I_A^1$, the pixel intensity value $I_O^1$ representing the identified pixel location in the output image data may be determined as follows $$I_O^1 = \alpha_b^1 I_N^1 + (1-\alpha_b^1) I_A^1 \quad (6)$$

Other examples of blending the pixel intensity value $I_N^1$ with the pixel intensity value $I_A^1$ are possible. In an example, generating the output image data may comprise blending the pixel intensity value $I_N^1$ with the pixel intensity value $I_A^1$ such that the pixel intensity value $I_N^1$ is weighted less than each of the pixel intensity values representing the identified pixel location which were used to generate $I_A^1$.

Generating output image data may comprise generating a pixel intensity value representing the second pixel location.

The pixel intensity value representing the second pixel location in the output image data may be generated according to a similar relationship as in equation 6. Wherein the pixel intensity value of the new frame of image data representing the second pixel location is weighted according to a respective parameter value corresponding to the second pixel location. In other examples, the pixel intensity value representing the second pixel location in the output image data may be generated by weighting the pixel intensity value of the new frame of image data representing the second pixel location according to $(1-\alpha_m^1)$. In this case the pixel intensity value of the accumulated frame of image data representing the second pixel location may be weighted according to $\alpha_m^2$.

Output image data may be further processed using other image processing techniques. For example, the output image data may be sent to be spatially de-noised, de-mosaiced, where the output image data is arranged in a colour filter pattern, or any other suitable image processing technique. In some examples, the output image data may comprise motion classifying data. The method may comprise outputting motion classifying data to provide information regarding the amount of motion in the regions in the output image data. As the data corresponding to the plurality of parameter values is updated for each new frame, this data may provide a cumulative indication of the amount of motion in a given region of the scene. For example, the method may comprise generating motion classifying data based on the data corresponding to the plurality of parameter values. Motion classifying data may indicate a degree of motion in each region, or pixel location, of the output image data. Motion classifying data may be generated by updating the data corresponding to the plurality of parameter values based on the output image data, the updated data corresponding to the plurality of parameter values may then be compared to one or more thresholds. The updated data corresponding to the plurality of parameter values resultant from this is not stored with the plurality of parameter values which are updated when updating the accumulated image data. For example, when generating the output image data, for pixel locations which are not identified by the motion detection, data corresponding to a parameter value which corresponds to the unidentified pixel locations may be updated to reflect that the new frame of image data has been blended with the accumulated image data. The updated data corresponding to the unidentified pixel locations may then be compared to one or more thresholds to determine how much motion on average has been detected in the regions represented by the unidentified pixel locations. Similarly, for identified pixel locations, data corresponding to parameter values corresponding to these pixel locations may be updated and compared to one or more thresholds. However, for the identified pixel locations the respective data corresponding to a respective parameter value may be updated to reflect that the pixel intensity value of the new frame of image data representing the identified pixel location is not fully blended with the accumulated frame of image data.

Motion Detection

Performing motion detection may comprise generating a plurality of motion detection values corresponding to a respective plurality of pixel locations based at least on differences between the new frame of image data and the accumulated frame of image data. A pixel location is then identified based on a comparison of a respective motion detection value and a respective parameter value.

Figure 2:
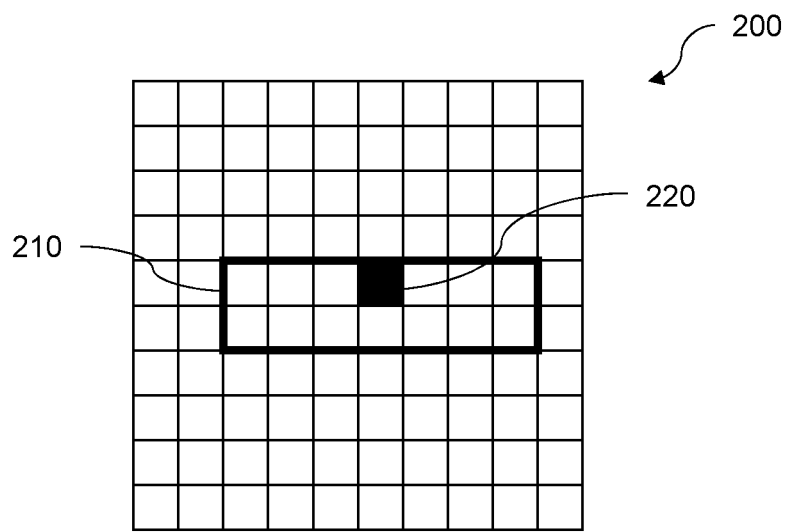
FIG. 2 shows schematically a plurality of pixel locations according to an example.

FIG. 2 shows schematically a plurality of pixel locations 200. Each pixel location of the plurality of pixel locations 200 may be represented by a respective pixel intensity value of the new frame of image data and a respective pixel intensity value of the accumulated frame of image data. FIG. 2 shows a set of pixel locations 210 enclosed within a bold outline. The set of pixel locations includes a pixel location 220. In an example, generating a motion detection value for the pixel location 220 comprises at least determining differences between a set of pixel intensity values of the new frame of image data representing the set of pixel locations 210 and a respective set of pixel intensity values of the accumulated frame of image data representing the set of pixel locations 210. The differences between the set of pixel intensity values of the new frame of image data and the set of pixel intensity values of the accumulated frame of image data are modified using a noise model. The noise model may be determined based on a noise profile lookup function and the actual value of noise at each pixel location may be determined using the pixel intensity values of the new frame of image data. Modifying the differences using the noise model may comprise determining a noise value for each pixel location in the set of pixel locations, and dividing each difference by a respective noise value.

Generating the motion detection value for the pixel location 220 may involve averaging the differences which have been modified by means of the noise model. This may also involve scaling the end result by a suitable function such that it is represented by a value between 0 and 1 as discussed above. Other values may also be possible provided that they can be used as weightings when combining pixel intensity values of the new frame of image data and the pixel intensity values of the accumulated frame of image data. As shown in FIG. 2, the set of pixel locations may comprise more than one pixel location. Generating a motion detection value for the pixel location 220 based on more than one pixel location reduces the noise and thereby increases the accuracy of the generating the motion detection value. Similarly, modifying the differences using a noise model may also reduce the noise and increase the accuracy of the motion detection value. The set of pixel locations 210 shown in FIG. 2 are arranged as a plurality of pixel locations directly adjacent to each other and including the pixel location 220. However, it will be appreciated that the pixel locations in the set of pixel locations may not be adjacent to one another. The set of pixel locations may be a set of neighbouring pixel locations, wherein the pixel locations in the set of pixel locations are close enough together that there is some correlation between motion detected in one of the pixel locations and at least one other pixel location in the set of pixel locations. The larger the set of pixel locations which are used to generate the motion detection value for the pixel location 220 the more reduction there is in the noise level when generating the motion detection value and hence the more accurate the motion detection value.

Figure 3:
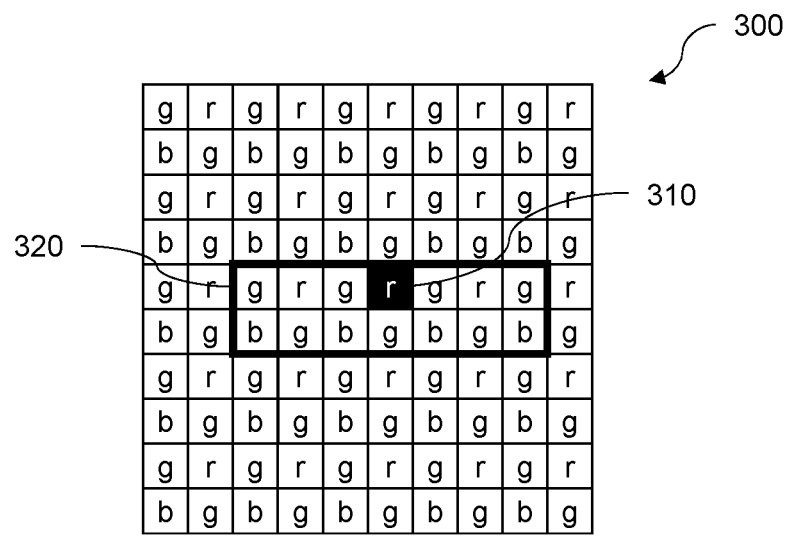
FIG. 3 shows schematically a plurality of pixel locations arranged in a colour filter pattern according to an example.

FIG. 3 shows schematically a plurality of pixel locations 300 arranged in a Bayer colour filter pattern wherein each pixel location is associated with a colour channel. An image sensor used to capture an image may comprise a colour filter array. A colour filter array may comprise an array of colour filter elements arranged in a predetermined pattern. Each colour filter element may correspond to a respective sensor pixel of the image sensor. The predetermined pattern may be considered to form a mosaic or a repeating pattern. A colour filter element may allow light of a particular colour to pass through and be received by a corresponding sensor pixel. A colour filter may also prevent light of certain colours from being passed through to the corresponding sensor pixel. A colour may refer to any range of wavelengths of light, for example, a clear, or white filter element which passes substantially all the received light through may still be considered a colour filter element. In other examples, colours may have narrower wavelength ranges and may include, green, blue, and red. In this way, the colour filter array may allow different sensor pixels of an array of sensor pixels to receive different colours of incident light. The pixel locations of the image may each be associated with a single colour. A Bayer colour filter pattern is a specific example of a colour filter pattern.

FIG. 3 shows a pixel location 310 for which a motion detection value is to be generated and a set of pixel location 320 including the pixel location 310. In the example shown in FIG. 3, the set of pixel locations 320 is arranged in a plurality of subsets of pixel locations, each subset of pixel locations corresponding to a colour channel, red, green, or blue. Generating the motion detection value for the pixel location 310 comprises generating a plurality of averages of modified differences, each average of modified differences corresponding to a subset of pixel locations. The modified differences being generated by determining a difference between respective pixel intensity values of the new frame of image data and respective pixel intensity values of the accumulated frame of image data and modifying these differences by a noise model. An average of modified differences is selected from the plurality of averages of modified differences. The selected average of modified differences has the largest magnitude of the plurality of averages of modified differences. Selecting the largest average of modified differences improves the motion detection for objects with a high colour saturation, for example where a red object moves against a black background only the red channel will change. By selecting the colour channel with the maximum differences, it is possible to detect motion in applications where objects with a high colour saturation move in the scene.

In an example, to generate an average of modified differences corresponding to a subset of pixel locations, the modified differences corresponding to the subset of pixel locations are summed. The sum is then divided by a square-root of a total quantity of pixel locations in the subset of pixel locations. Generating an average by dividing the sum by a square-root of the total number of pixel locations in the subset of pixel locations rather than dividing the sum by the total number of pixel locations in the subset of pixel locations may result in each of the averages of modified differences having the same degree of noise. This may prevent false positives in any of the subsets of pixel locations from dominating the motion detection more than the other subsets of pixel locations.

The selected average of modified differences may be combined with a further average of modified differences determined based on at least one further set of pixel locations, the further set of pixel locations including the pixel location 310. The further average of modified differences for the further set of pixel locations may be determined using the same method as above. However, the further set of pixel locations may include pixel locations which are not included in the set of pixel locations 320. Regions in a frame of image data in which there are motion may generally be homogenous and may cover a larger number of pixel locations than those included in the set of pixel locations 320. Increasing the size of the set of pixel locations 320 may make it easier to differentiate between motion regions and noise. However, considering a larger set of pixel locations may make generating a motion detection value more computationally expensive. Combining the selected average of modified differences calculated for the set of pixel locations 320 with a further average of modified differences calculated based on a further set of pixel locations similarly increases the accuracy of detection motion but does so without significantly increasing the computational expense.

In some examples, the set of pixel locations 320 and the further set of pixel locations may overlap. The further set of pixel locations may be the same size and shape as the set of pixel locations 320 but may be offset by one pixel location, such as being one row higher. Alternatively, the only pixel location which is the same between the set of pixel locations 320 and the further set of pixel locations may be the pixel location 310.

The further average modified difference may be an average of modified differences which is determined by interpolating from a plurality of further selected averages of modified differences each determined based on a respective plurality of further sets of pixel locations each of the plurality of further sets of pixel locations comprising the pixel location 320. Rather than storing a selected average of modified differences for each set of pixel locations, the method may comprise storing a subset of these values. The method may involve interpolating from these values to determine a further average modified difference. This may reduce the storage space needed to store the averages of modified differences.

Figure 4:
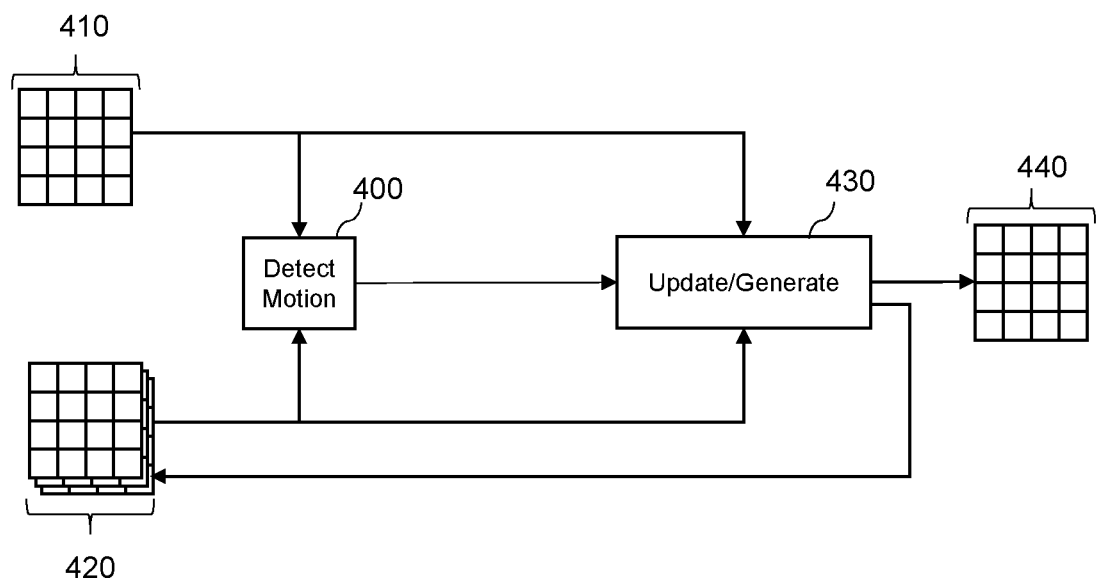
FIG. 4 shows schematically an image processing work flow according to an example.

FIG. 4 shows schematically an image processing work flow according to an example. At a block 400, a new frame of image data 410 and an accumulated frame of image data 420 are used to detect motion in the new frame of image data 410. The result of the motion detection at block 400, the new frame of image data 410 and the accumulated frame of image data 420 are then used, at block 430, to generate output image data 440 and to update the accumulated frame of image data 420. It will be appreciated that processes performed at block 400 and 430 may be performed in separate blocks. For example, generating output image data and updating the accumulated image data may be performed in separate blocks.

Figure 5:
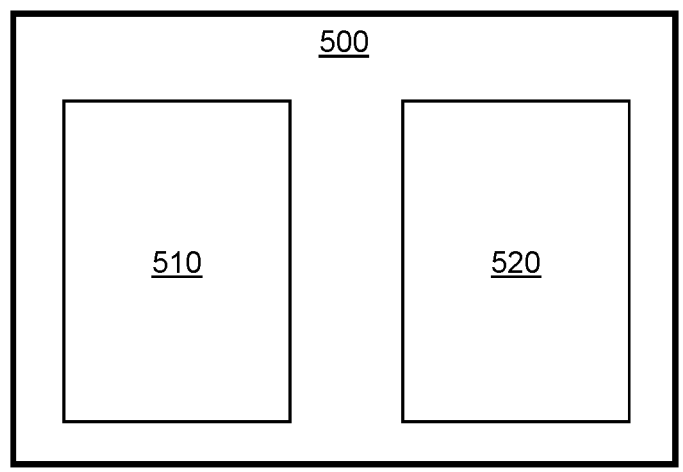
FIG. 5 shows schematically image processing apparatus according to an example.

FIG. 5 shows image processing apparatus 500 comprising at least one processor 510 and at least one memory 520. The at least one memory 520 including computer program code, the at least one memory 520 and the computer program code configured to, with the at least one processor 510, cause the image processing apparatus 500 to perform the method for processing image data according to the examples described herein. The image processing apparatus 500 may be comprised in a suitable computing device, such as a smart telephone, a digital camera, or a computer. In some examples, the image processing apparatus 500 is located in device comprising at least one image sensor for generating one or more frames of image data. In other examples, the image processing apparatus 500 may be comprised in a computing device without image capturing capabilities but which may be communicatively coupled to an image capture device. The image processing apparatus 500 may be communicatively coupled to an image capture device over a local area network or a wide area network by any suitable wired or wireless communication means. The image processing apparatus 500 may be an application specific integrated circuit. The application specific integrated circuit may include any number of processors, microprocessor, and/or memory blocks, including RAM, ROM, EEPROM, or flash memory. The application specific integrated circuit may comprise an image signal processor, configured to process image data according to the method described herein. Alternatively, the image processing apparatus 500 may be a non-specific computing device such as, for example, a desktop computer, or mobile computing device, configured to perform the method as described above.

Figure 6:
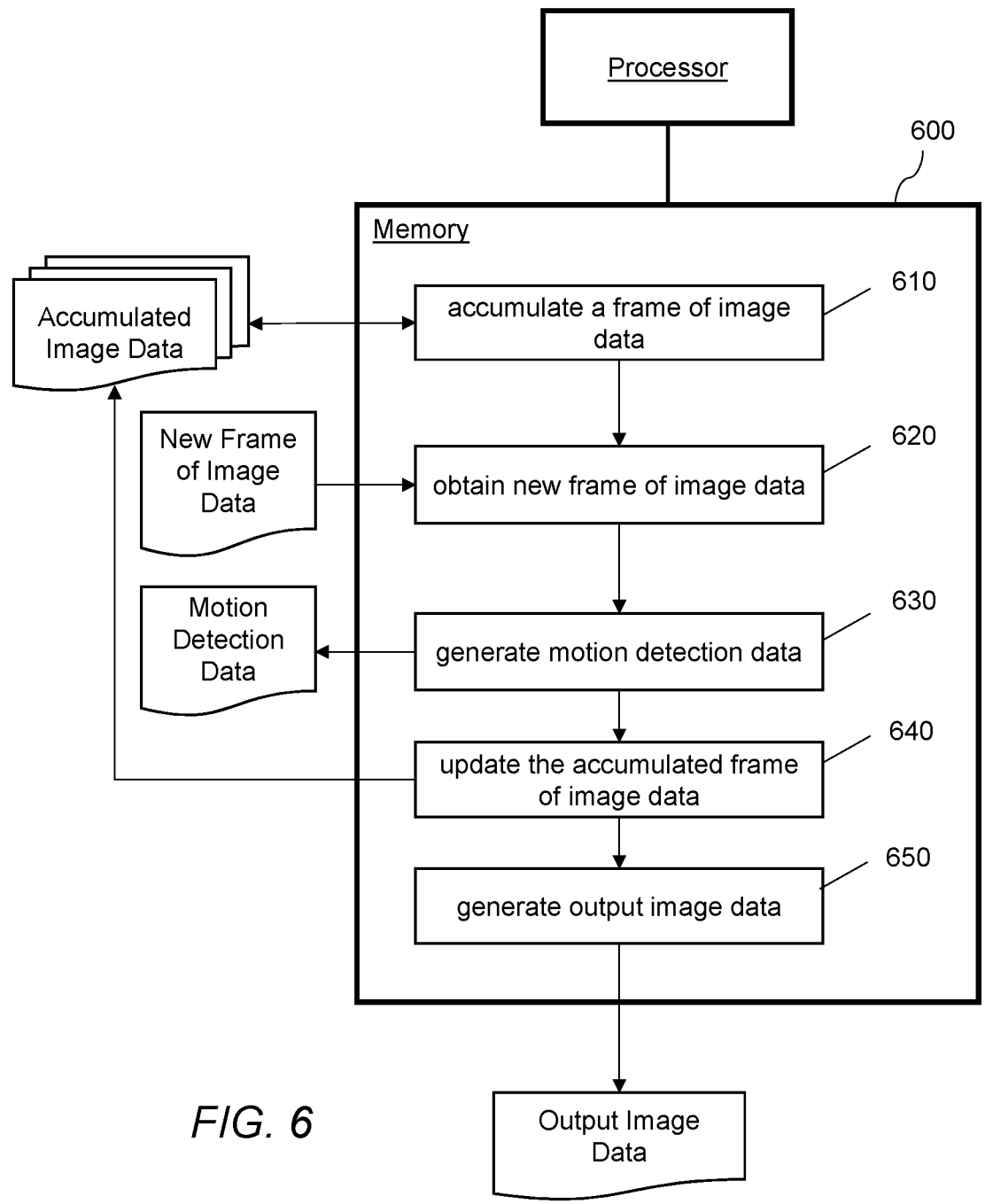
FIG. 6 shows schematically a non-transitory computer readable storage medium according to an example.

FIG. 6 shows a schematic diagram of a non-transitory computer readable storage medium 500 comprising computer-executable instructions. The executable instructions, when executed by a processor, may cause operation of an image processing system to perform a method comprising at least: storing accumulated image data representing a plurality of frames of image data, the accumulated image data including an accumulated frame of image data comprising a plurality of pixel intensity values representing a respective plurality of pixel locations, as shown at block 610; obtain a new frame of image data comprising a plurality of pixel intensity values representing a respective plurality of pixel locations, as shown at block 620; perform motion detection based at least on the new frame of image data, the motion detection identifying a pixel location in which motion is detected, as shown at block 630; update the accumulated frame of image data by combining the accumulated frame of image data and the new frame of image data, as shown at block 640; and generate output image data by combining the accumulated frame of image data and the new frame of image data, as shown at block 650, wherein the method is motion-sensitive such that a pixel intensity value of the new frame of image data representing the identified pixel location contributes more to a pixel intensity value representing the identified pixel location in the updated accumulated frame of image data than to a pixel intensity value representing the identified pixel location in the output image data.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of processing image data comprising:
    storing accumulated image data representing a plurality of frames of image data, the accumulated image data including an accumulated frame of image data comprising a plurality of pixel intensity values representing a respective plurality of pixel locations and also including data corresponding to a plurality of spatially variant parameter values corresponding to respective pixel locations, the plurality of spatially variant parameter values being dependent on a number of frames of image data which have been accumulated at the respective pixel location;
    obtaining a new frame of image data comprising a plurality of pixel intensity values representing a respective plurality of pixel locations;
    performing motion detection based at least on the new frame of image data and the accumulated frame of image data, the motion detection identifying a pixel location in which motion is detected based on a comparison of a plurality of motion detection values corresponding to a respective plurality of pixel locations and respective parameter values of the plurality of spatially variant parameter values, wherein the motion detection values are generated based at least on differences between the pixel intensity values of the accumulated frame of image data and respective pixel intensity values of the new frame of image data;
    updating the accumulated image data by:
        updating the accumulated frame of image data by combining the accumulated frame of image data and the new frame of image data; and
        updating the data corresponding to the plurality of spatially variant parameter values; and
    generating output image data by combining the accumulated frame of image data and the new frame of image data,
    wherein the method is motion-sensitive such that a pixel intensity value of the new frame of image data representing the identified pixel location contributes more to a pixel intensity value representing the identified pixel location in the updated accumulated frame of image data than to a pixel intensity value representing the identified pixel location in the output image data.

2. The method of claim 1, wherein the pixel intensity value of the new frame of image data representing the identified pixel location contributes more than a pixel intensity value of the accumulated frame of image data representing the identified pixel location to the pixel intensity value representing the identified pixel location in the updated accumulated frame of image data.

3. The method of claim 1, wherein the pixel intensity value of the new frame of image data representing the identified pixel location contributes less than a pixel intensity value of the accumulated frame of image data representing the identified pixel location to the pixel intensity value representing the identified pixel location in the output image data.

4. The method of claim 1, wherein updating the accumulated frame of image data comprises selecting a respective pixel intensity value of the new frame of image data to represent the identified pixel location.

5. The method of claim 1, wherein generating the output image data comprises selecting a respective pixel intensity value of the accumulated frame of image data to represent the identified pixel location.

6. The method of claim 1, wherein updating the accumulated image data comprises generating the pixel intensity value representing the identified pixel location in the updated accumulated frame of image data by blending the pixel intensity value of the new frame of image data representing the identified pixel location with a pixel intensity value of the accumulated frame of image data representing the identified pixel location based on a respective motion detection value corresponding to the identified pixel location.

7. The method of claim 1, wherein updating the accumulated frame of image data comprises updating data corresponding to a parameter value of the plurality of parameter values which corresponds to the identified pixel location based on the motion detection value.

8. The method of claim 1, wherein generating output image data comprises generating the pixel intensity value representing the identified pixel location in the output image data by blending the pixel intensity value of the new frame of image data representing the identified pixel location with the pixel intensity value of the accumulated frame of image data representing the identified pixel location based on a respective parameter value corresponding to the identified pixel location.

9. The method of claim 1, wherein the identified pixel location is a first pixel location and updating the accumulated image data comprises generating a pixel intensity value representing a second pixel location which is not identified by the motion detection by blending a pixel intensity value of the new frame of image data representing the second pixel location with a pixel intensity value of the accumulated frame of image data representing the second pixel location based on a respective parameter value.

10. The method of claim 9, wherein updating the accumulated frame of image data comprises updating data corresponding to a respective parameter value corresponding to the second pixel location.

11. The method of claim 1, wherein generating a motion detection value for a said pixel location comprises at least:
determining differences between a set of pixel intensity values of the new frame of image data representing a set of pixel locations including the said pixel location and a respective set of pixel intensity values of the accumulated frame of image data representing the set of pixel locations; and
modifying the differences using a noise model.

12. The method of claim 11, wherein the set of pixel locations comprises more than one pixel location.

13. The method of claim 12, wherein the set of pixel locations is arranged in a plurality of subsets of pixel locations, each subset of pixel locations corresponding to a colour channel and generating the motion detection value for the said pixel location comprises:
generating a plurality of averages of modified differences, each average of modified differences corresponding to a subset of pixel locations; and
selecting from the plurality of averages of modified differences, an average of modified differences of the plurality of averages of modified differences which has a largest magnitude.

14. The method of claim 13, wherein a said average of modified differences corresponding to a said subset of pixel locations is generated by summing the modified differences corresponding to the subset of pixel locations and dividing the sum of modified differences corresponding to the subset of pixel locations by a square-root of a total quantity of pixel locations in the subset of pixel locations.

15. The method of claim 13, wherein the selected average of modified differences is combined with a further average of modified differences determined based on at least one further set of pixel locations, the further set of pixel locations including the said pixel location, and, optionally, wherein the set of pixel locations and the further set of pixel locations overlap.

16. The method of claim 13, wherein the selected average of modified differences is combined with a further average of modified differences determined by interpolating from a plurality of further selected averages of modified differences each determined based on a respective plurality of further sets of pixel locations each of the plurality of further sets of pixel locations comprising the said pixel location.

17. The method of claim 11, comprising generating the motion detection value for the said pixel location by averaging the modified differences.

18. Image processing apparatus comprising:
at least one processor;
at least one memory including computer program code, the at least one memory and the computer program code configured to, with the at least one processor, cause the apparatus to perform a method comprising at least:
storing accumulated image data representing a plurality of frames of image data, the accumulated image data including an accumulated frame of image data comprising a plurality of pixel intensity values representing a respective plurality of pixel locations and also including data corresponding to a plurality of spatially variant parameter values corresponding to respective pixel locations, the plurality of spatially variant parameter values being dependent on a number of frames of image data which have been accumulated at the respective pixel location;
obtaining a new frame of image data comprising a plurality of pixel intensity values representing a respective plurality of pixel locations;
performing motion detection based at least on the new frame of image and the accumulated frame of image data, the motion detection identifying a pixel location in which motion is detected based on a comparison of a plurality of motion detection values corresponding to a respective plurality of pixel locations and respective parameter values of the plurality of spatially variant parameter values, wherein the motion detection values are generated based at least one differences between the pixel intensity values of the accumulated frame of image data and respective pixel intensity values of the new frame of image data;
updating the accumulated image data by:
updating the accumulated frame of image data by combining the accumulated frame of image data and the new frame of image data; and
updating the data corresponding to the plurality of spatially variant parameter values; and
generating output image data by combining the accumulated frame of image data and the new frame of image data,
wherein the method is motion-sensitive such that: a pixel intensity value of the new frame of image data representing the identified pixel location contributes more to a pixel intensity value representing the identified pixel location in the updated accumulated frame of image data than to a pixel intensity value representing the identified pixel location in the output image data.

* * * * *